United States Patent

Rattaro et al.

Patent Number: 5,722,647
Date of Patent: Mar. 3, 1998

[54] WORKPIECE HOLDER, PARTICULARLY ADAPTED FOR HOLDING EYEGLASSES LENSES

[76] Inventors: Armando Rattaro, Via delle Eriche 69/24, Genova; Camillo Rattaro, Viale Villa Chiesa 40A/3, Genova-Pegli; Pierino Boldrini, Salita Superiore S. Tecla 23, Genova, all of Italy

[21] Appl. No.: 635,383

[22] Filed: Apr. 19, 1996

[30] Foreign Application Priority Data

Apr. 27, 1995 [IT] Italy .................. GE95A0043

[51] Int. Cl.⁶ .................. B23B 31/30
[52] U.S. Cl. .................. 269/45; 269/91; 269/94; 269/75; 269/152; 269/258; 269/257; 269/21; 269/274; 269/275; 269/238; 269/71
[58] Field of Search .................. 269/258, 257, 269/274, 275, 75, 94, 91, 71, 152, 37, 45, 21, 238; 451/384

[56] References Cited

U.S. PATENT DOCUMENTS

| | | |
|---|---|---|
| 880,948 | 3/1908 | Wilhelm et al. .................. 269/258 |
| 1,494,333 | 5/1924 | Bausch . |
| 2,322,707 | 6/1943 | Wetzler .................. 269/94 |
| 2,346,088 | 4/1944 | Shobert .................. 269/258 |
| 3,645,632 | 2/1972 | Schmidt et al. . |
| 4,491,306 | 1/1985 | Eickhorst .................. 269/21 |
| 4,613,120 | 9/1986 | Kozar .................. 269/152 |
| 4,802,661 | 2/1989 | Jewett, Sr. . |
| 5,462,475 | 10/1995 | Kennedy .................. 451/384 |

FOREIGN PATENT DOCUMENTS

| | | |
|---|---|---|
| 1919248 | 4/1969 | Germany . |
| 1947009 | 3/1971 | Germany . |

*Primary Examiner*—Robert C. Watson
*Attorney, Agent, or Firm*—Larson & Taylor

[57] ABSTRACT

A workpiece holder, particularly adapted for holding eyeglasses lenses (L), comprises a support (12) on which there are arranged two clamps (14, 17, 117) for clamping each a portion of a lense. Each clamp defines an axis (A) which is substantially perpendicular to the portion of lense clamped thereby. Each clamp is positionable and lockable with said axis (A) oriented in any direction at the interior of an ideal cone (A1 - A2) having a vertex through which the said axis (A) is passing. Positioning means (3, 4, 40) are provided for displacing the said support (12) along a horizontal plane with respect to a fixed tool (28).

12 Claims, 8 Drawing Sheets

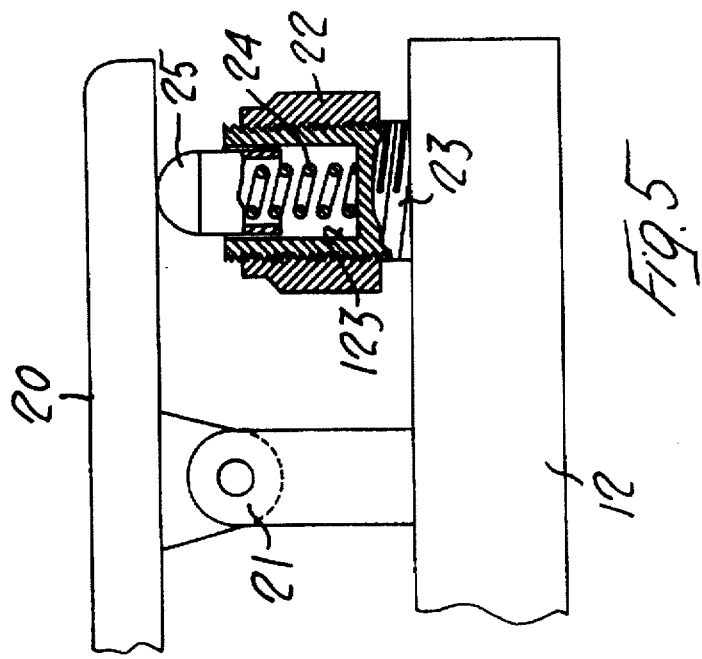
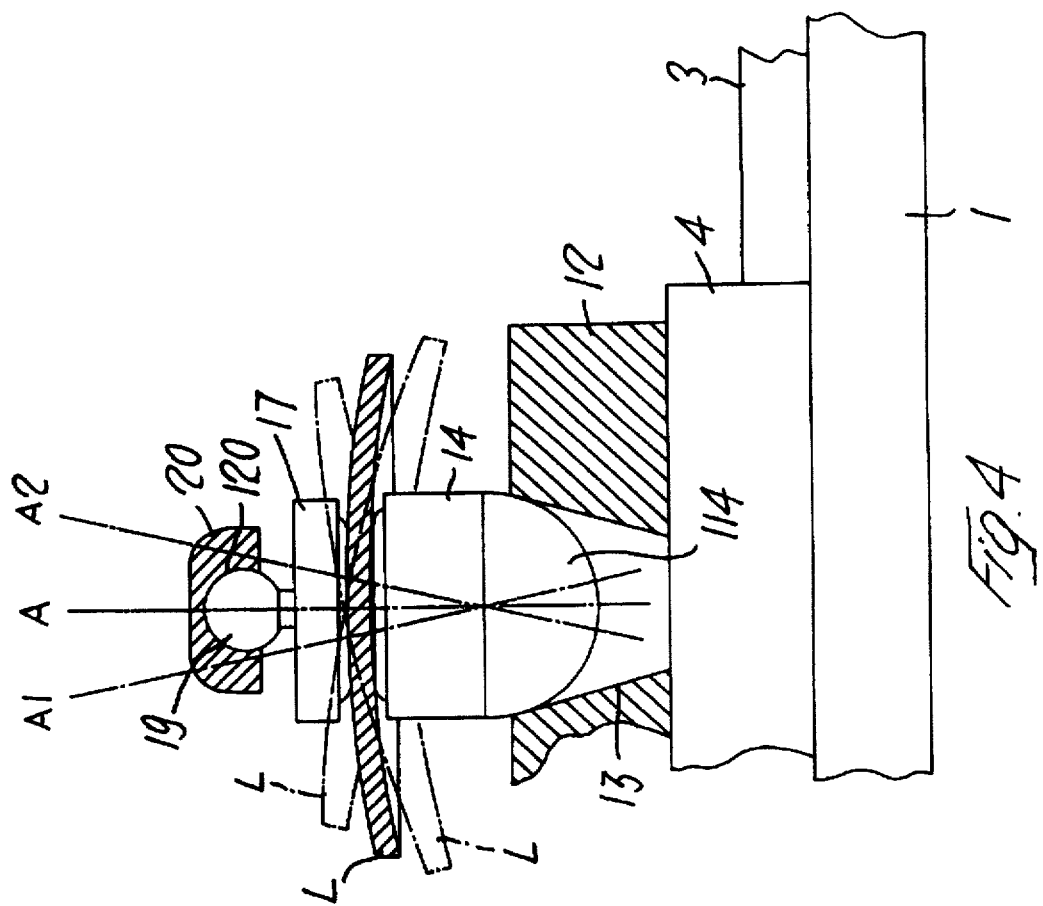

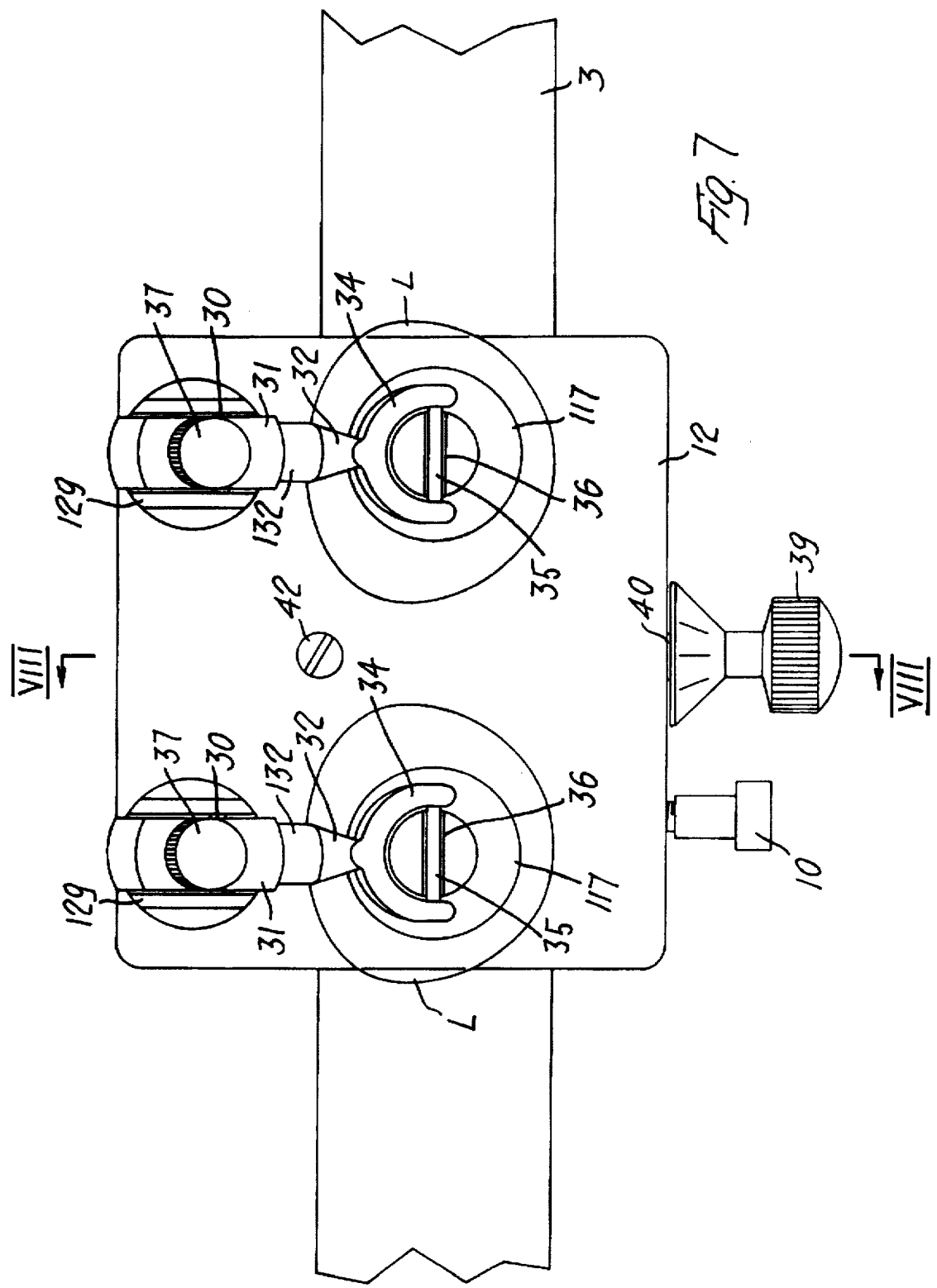

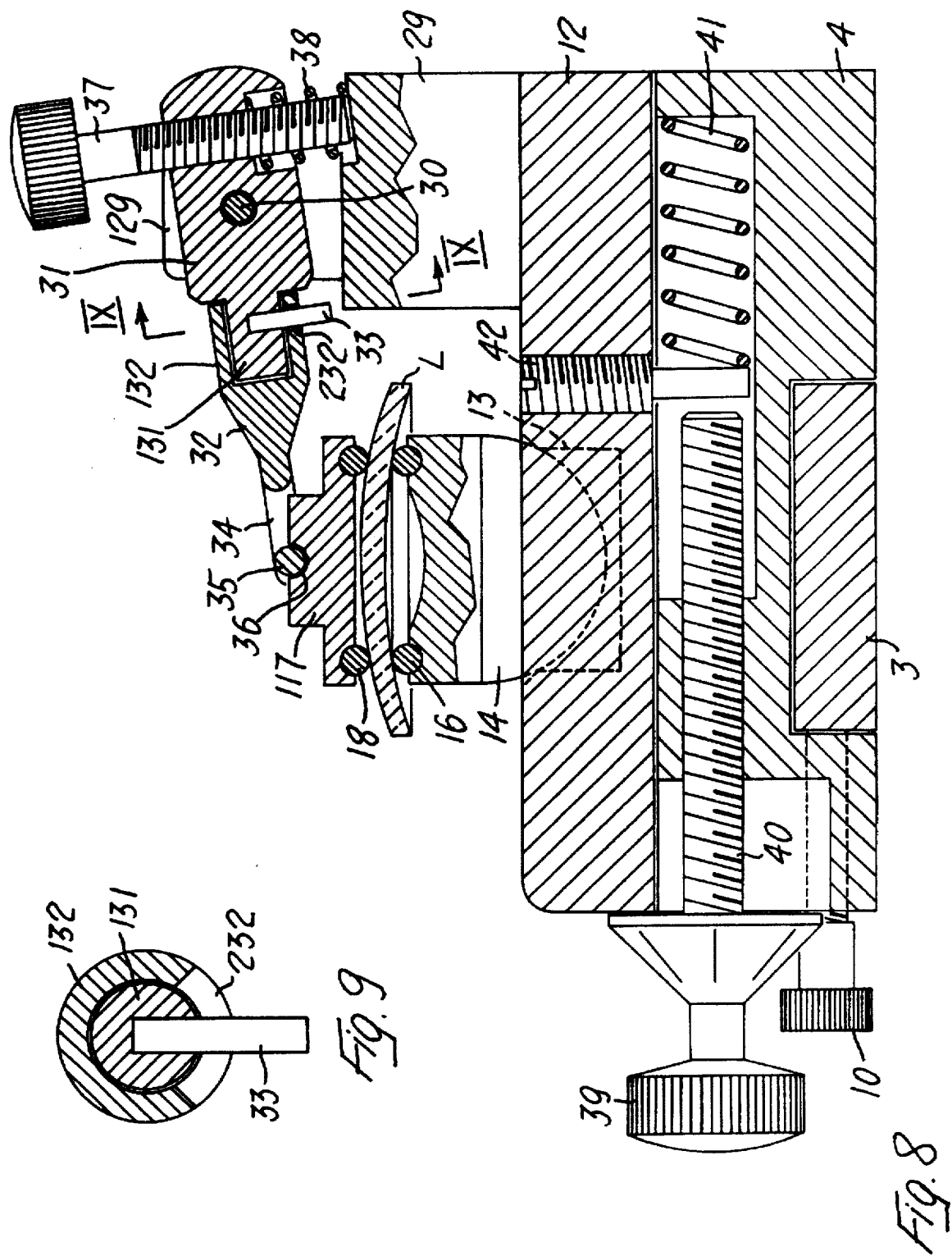

WORKPIECE HOLDER, PARTICULARLY ADAPTED FOR HOLDING EYEGLASSES LENSES

The present invention relates to a a workpiece holder for holding eyeglasses lenses which must be subjected to machining operation by machine tools. More particularly, the holder according to the invention is intended for holding eyeglasses lenses made of plastics which require particular machining operations, such as drilling bores, cutting slots, making notches and recessed portions and any other operations which require removal of material, in order to create the suitable mounting points for the side bars and the nose bridges which are required in the manufacture of rimless glasses.

According to the invention, there is provided a workpiece holder for holding eyeglasses lenses which is characterized by the fact of comprising a support on which there is arranged at least one clamp for clamping a portion of a lense, said clamp defining an axis which is substantially perpendicular to the portion of lense clamped thereby, said clamp being positionable and lockable with said axis oriented in any direction at the interior of an ideal cone having a vertex through which the said axis is passing.

In the workpiece holder according to the invention, preferably a pair of clamps are mounted on the support, and means are provided for displacing the said support with respect to a fixed tool along a horizontal plane in orthogonal directions and according to an angular direction.

Further features and advantages of the workpiece holder according to the invention will appear evident from the following detailed description of some preferred embodiments made by way of non-limiting examples with reference to the figures of the attached drawings, in which:

FIG. 4 shows a detail, with parts in section, illustrating one holding clamp for a lense, and the possibilities of inclination of the lens with respect to the working plane;

FIG. 5 shows a detail, with parts in section, of the locking system for the clamp of FIGS. 3 and 4;

FIG. 7 is a view from above of the holder according to FIG. 6;

FIG. 8 is a section along line VIII—VIII of the holder shown in FIG. 7;

FIG. 9 is a section, along line IX—IX and in enlarged scale, of a detail of FIG. 8;

In the figures, identical or similar parts are represented by the same numerals or letters.

Figure 1:
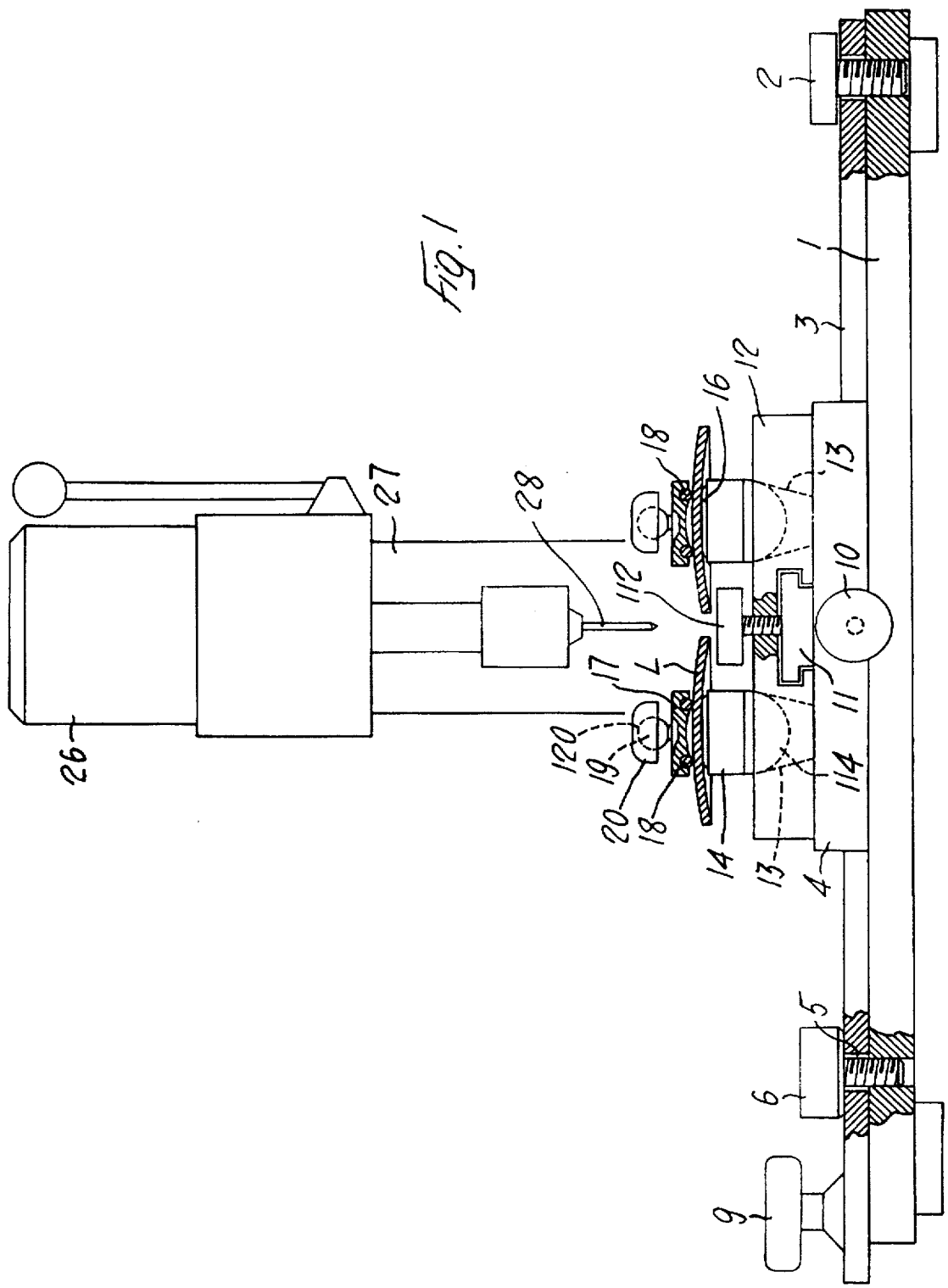
FIG. 1 is a front elevation view, with parts in section, of the workpiece holder according to the invention.
Figure 2:
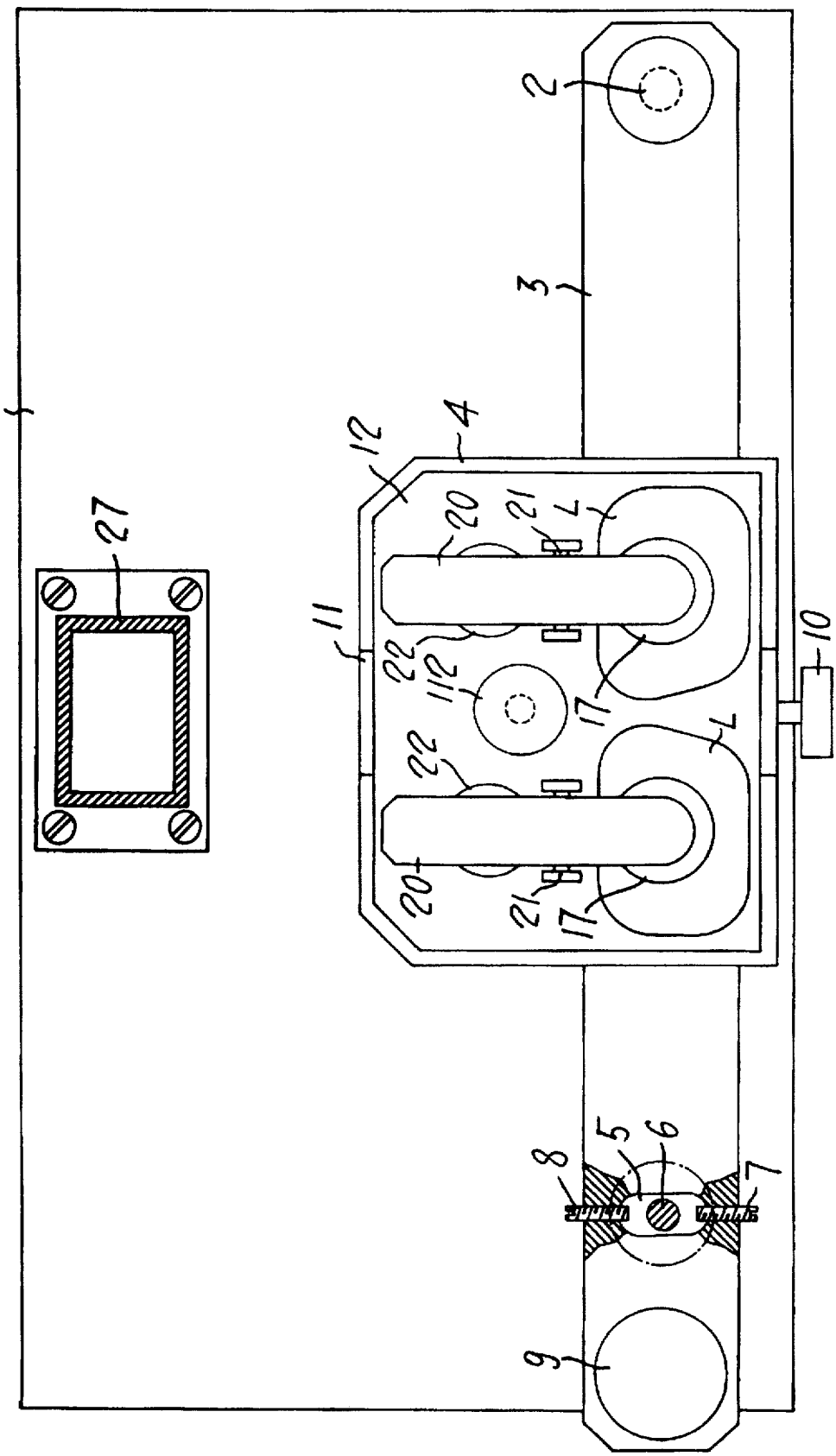
FIG. 2 is a view from above, with parts in section and with the omission of the machine tool, of the holder according to FIG. 1.
Figure 3:
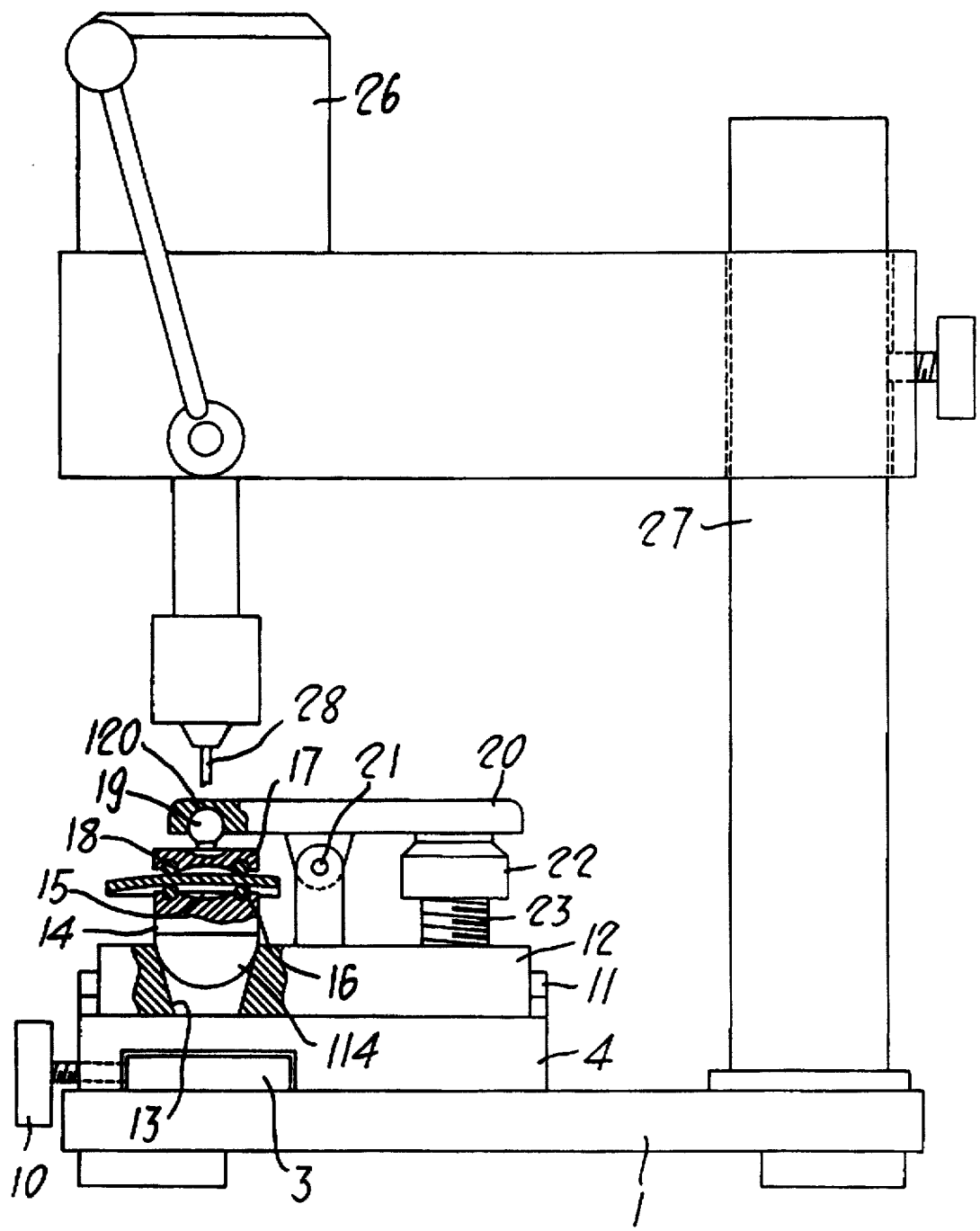
FIG. 3 is a side elevation view, with parts in section, of the holder according to FIG. 1.
Figure 6:
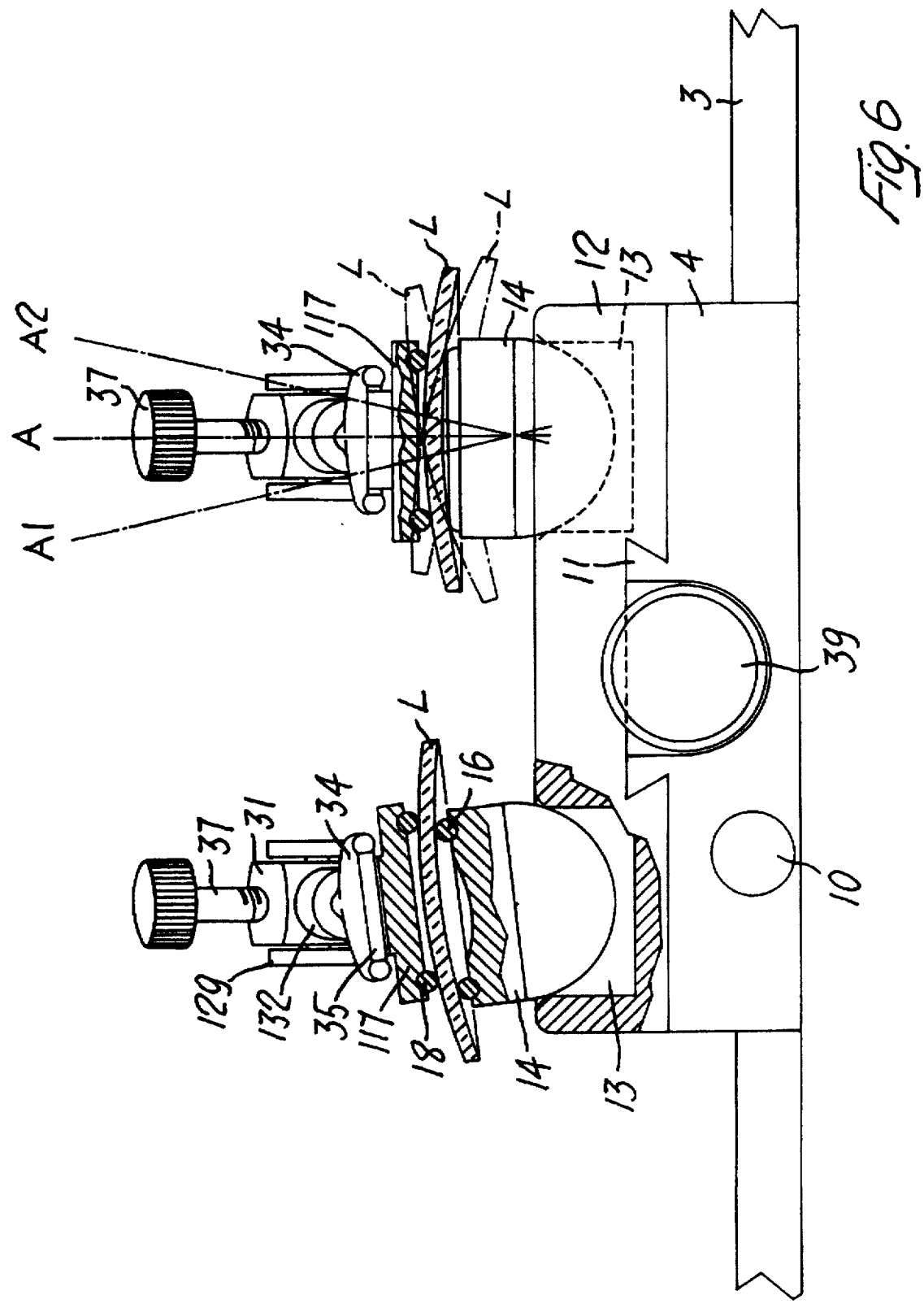
FIG. 6 is a front view, with parts in section, of a detail of a modified embodiment of the workpiece holder according to the invention.

With reference to the first embodiment shown in FIGS. 1 to 5, the workpiece holder according to the invention comprises a base 1 onto which there is pivoted at 2 a longitudinal guide 3 for the displacement of a longitudinal slide 4. The longitudinal guide 3 can swing about fulcrum 2 according to an angle which is delimited by the slot 5 provided at the end of the guide 3 opposed to fulcrum 2. Slot 5 cooperates with an abutment and locking pin 6, and the amplitude of the oscillation is defined with great precision by means of the adjustable pins 7, 8 which are provided at the ends of the slot 5. The partial unscrewing and lifting of the pin 6 permits the free angular movement of the longitudinal guide 3, while the tight screwing of said pin 6 locks the longitudinal guide 3 in the desired angular position. The angular displacement of guide 3 is manually effected through knob 9.

On longitudinal guide 3 there is slidably mounted a longitudinal slide 4 which can be locked in the desired position by means of the locking screw 10. A transverse slide support 12 is mounted slidable in transverse direction thanks to a suitable guide 11 on the the longitudinal slide 4. The support 12 can be locked in the desired position by means of a locking screw 12 and is provided with a pair of seats 13 each of which is intended to accommodate the lower portion of the clamp device.

Each seat 13 can be shaped as hemispherical or as a portion of a sphere, or, as in the present case, it can be simply obtained by means of a bore having circular section so as to be capable of housing and supporting a part of the lower hemispherical end portion 114 of a cylindrical body 14, with possibility of inclination in any desired direction of the longitudinal axis A of the said cylindrical body within the limits of an ideal cone A1-A2, as consented by a spherical joint.

The cylindrical body 14 constitutes the lower element of the clamp (see particularly FIG. 4). The body 14 terminates at its upper end with a head 15 which is preferably concave and presents a peripheral ring 16 made of rubber or synthetic rubber-like material so as to realize a concave dish surface which is adapted to accommodate (if required) the convex side of a lens L while the contact with any side of the lens L takes place through the projecting edge of ring 16.

The upper portion of the clamp of the workpiece holder is constituted by a plate element 17 which presents a concave lower face and is provided with a peripheral ring 18 made of rubber or synthetic material, similarly to the upper head 15 of the lower cylindrical body 14. The plate 17 is mounted by means of a ball-and-socket joint 19-120 at the end of a locking lever 20 fulcrumed on an upright member 21 provided on the transverse slide 12. The movement of the locking lever 20 (see FIG. 5) is controlled by a threaded locking ring 22 which can be moved by screwing along a corresponding threaded pin 23 fixed on the support 12.

In order to maintain permanently a minimum elastic clamping between the plate 17 and the lower body 14, which elastic clamping is particularly useful for the insertion and the correct positioning of the lens L to be machined, the pin 23 presents an axial cavity 123 at the interior of which there is housed a spring 24 which urges upwardly a hollow piston element 25 slidably mounted inside the upper portion of the axial cavity 123. In this manner, the lever 20 is permanently urged so as to elastically clamp the plate 17 against the body 14, independently from the rigid locking action of the locking ring 22.

On the base 1 there is mounted in suitable position a machine tool 26 of the type presenting an upright 27. On the vertically movable spindle of the machine tool 26 there can be mounted any suitable machining tool 28, such as a drill or a milling cutter, depending upon the machining operation which is required.

In operation, each lens L of the two lenses for a pair of eyeglasses is positioned in the respective clamp. This operation is effected with the locking ring 22 in its lowered position, so as to permit the elastic clamping of the lens L between the plate 17 and the lower body 14 due to the action of the piston 25 urged by spring 24. Thanks to this elastic clamping, each lens L can be easily positioned by taking in consideration the point to be machined and the consequent desired inclination of the surface to be machined with respect to the tool 28 (see FIG. 4). Subsequently, the lens which has been correctly positioned is rigidly locked in the respective clamp by screwing the locking ring 22 in upward direction. The lenses can be now subjected to the desired machining operation the one after the other, by suitably displacing the slides 4 and 12. After the machining of the lenses L, the locking rings 22 are moved to unlocking position and the lenses are removed.

From the above it will be appreciated that the axis A of the cylindrical body 14 is substantially perpendicular to the portion of lense clamped between the rings 16 and 18 and can be considered as the axis of the clamp.

With reference to FIGS. from 6 to 8, another embodiment of the workpiece holder is illustrated which differs from the preceding embodiment as for what concerns the upper element of the clamp and the respective locking lever device. According to this modified embodiment, there is provided an upright member 29 for the locking lever 31 which is fulcrumed at 30 in the fork-shaped ends 129 of said upright 29. The locking lever 31 terminates with a cylindrical portion 131 onto which there is invested axially rotatable, by its corresponding cylindrical cavity 132, the small arm 32. As shown in FIG. 9, the axial rotation of the small arm 32 on the cylindrical portion 131 of lever 31 is angularly limited by the cooperation of pin 33 and the circumferential slot 232 of the cylindrical cavity 132 of the small arm 32. The pin 33 serves also for locking the small arm 32 against longitudinal movement.

The small arm 32 terminates with a fork, the ends 34 of which are connected by a transverse pin 35 adapted for bearing against a corresponding groove 36 obtained in the upper side of the upper plate 117 of the clamp. Similarly as in the preceding embodiment, there are provided means for permanently elastically urging the lever 31 into clamping position, and for rigidly locking the said lever 31 to the said clamping position. For this purpose, at the end of locking lever opposite to the end 131 carrying the small arm 32, there is provided a locking screw 37 and a spring 38 interposed between the said end of the locking lever 31 and the upright support 29.

The connection between the transverse pin 35 and the groove 36 of upper plate 117 can be of the loose type by simple contact, as illustrated in FIG. 8, or it can be made permanent but in a removable manner, as for example by snap fitting onto the transverse pin of a suitable elastic element provided on the groove, or by any other suitable fastening means.

With particular reference to FIG. 8, it can be appreciated that the transverse movement of the support 12 onto the longitudinal slide 4 can be micrometrically controlled by means of an actuating knob 39 driving the screw 40 which engages a corresponding threaded bore on slide 4, against the action of spring 41 interposed between slide 4 and pin 42 of slide 12.

Figure 10:
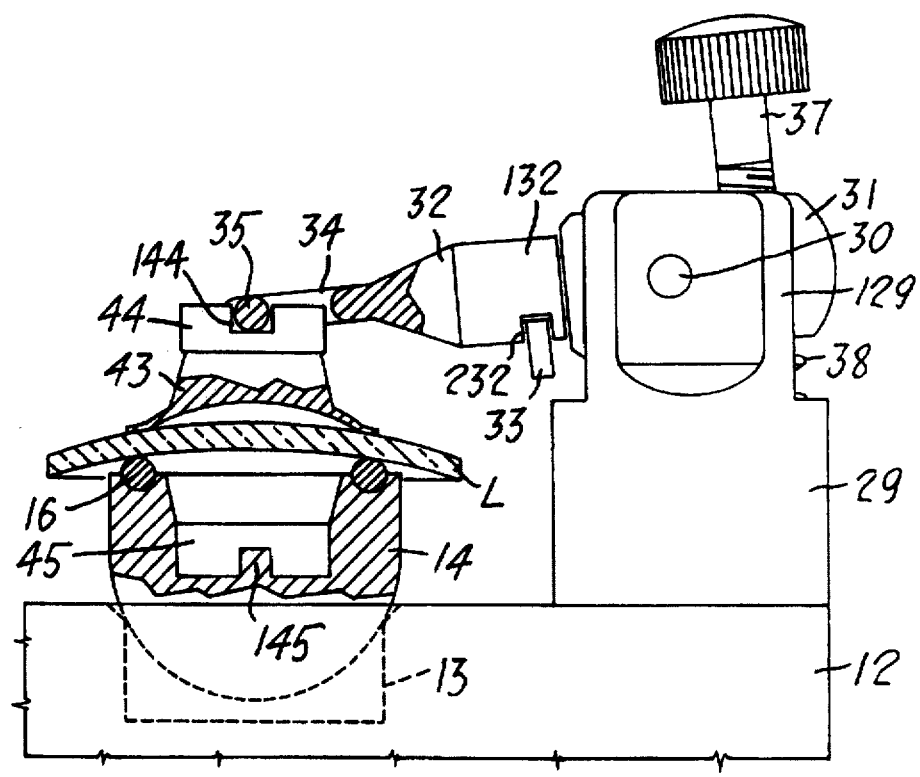
FIGS. 10 and 11 are side views, with parts in section, of a detail of the holder according to FIG. 6, adapted for clamping lenses carried by conventional type suction cups.
Figure 11:
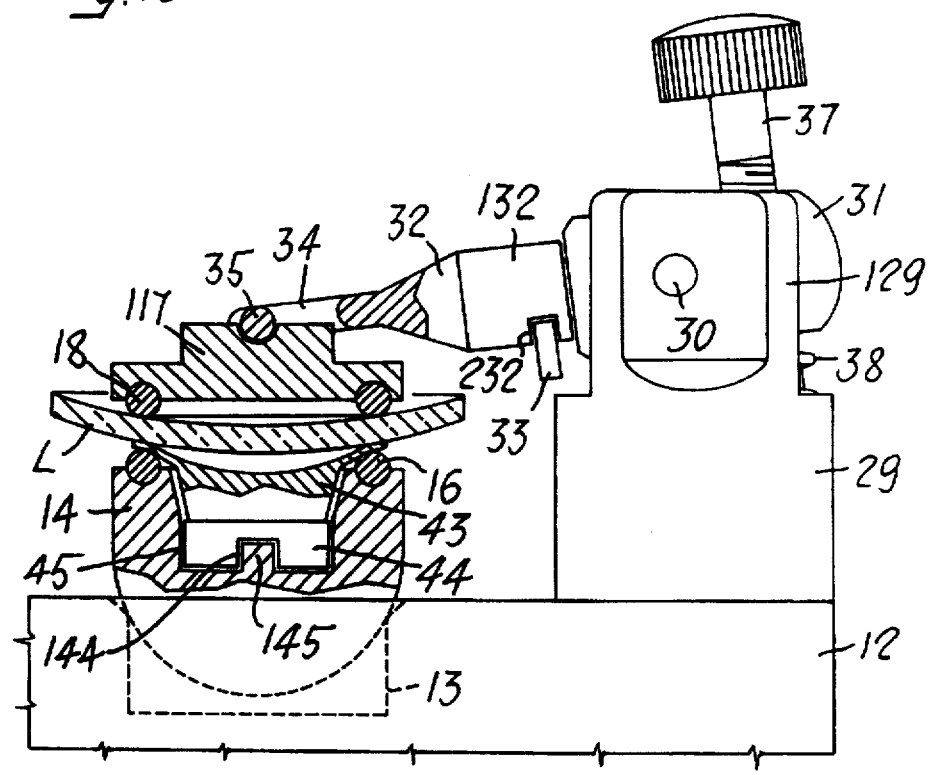

In FIGS. 10 and 11 there is shown a further modification of the preceding embodiment, which is particularly adapted for the processing of lenses coming from previous machining operations, such as for example cutting operations. In the said previous machining operations, the lenses L are held firm by suitable means such as for example suction cups 43 provided with a base portion 43 which presents usually a longitudinal groove 144 for the correct positioning of the lense at any working station. As it can be appreciated in FIG. 10, the suction cup 43 carrying the lens L takes the place of the upper plate (117 in FIG. 8) of the clamp. The transverse pin 35 of the small arm 32 of the locking lever 31 will engage the corresponding groove 144 provided in the base portion 44 of the suction cup. By suitably obtaining, in the lower element 14 of the clamp, a recessed cavity 45 which matches the outer shape of the suction cup 43 and of its base 44, it will be possible to effect suitable machining operations of the lens L on both sides of the lense itself, by simply overturning the suction cup and the lens carried thereby. The suction cup 43 will be housed in the cavity 45 of the lower element 14 and an upper plate 117 will be inserted to substitute the overturned suction cup which does not act any more as upper element of the clamp. Advantageously, the bottom of cavity 45 of the lower element 14 will present a projecting rib 145 adapted to engage the groove 144 of the base 44 of suction cup 43.

Although the movements of the slides, supports and of the machine tool have been illustrated as manually controlled, it goes without saying that all the operations of the various components of the workpiece holder can be fully or partially automatized and electronically controlled in a manner which is known to the persons skilled in the art.

It is also understood that reference marks or signs will be provided in a suitable manner on the single components of the workpiece holder, in order to facilitate the relative positioning of the said components.

We claim:

1. A holder for holding the two lenses (L) of a pair of rimless eyeglasses for their machining by at least one fixed machining tool (28) to obtain the suitable mounting points for the side bars and nose bridge, comprising a pair of clamps (14, 17, 117) each of which is intended for holding one lens, said two clamps being mounted on a common support (12), means (3, 4, 40) being provided for displacing the said support (12) along a horizontal plane with respect to the fixed tool (28), each clamp (14, 17, 117) being designed for clamping a portion of a lens (L), and defining an axis (A) which is substantially perpendicular to the portion of lens clamped thereby, said clamp being positionable and lockable with said axis (A) oriented in any direction at the interior of an ideal cone (A1-A2) having a vertex through which the said axis (A) is passing.

2. A holding according to claim 1, in which the means for displacing the support (12) along an horizontal plane with respect to the fixed tool (28) comprise:

a slide-carrying guide (3) which s fulcrumed so as to be angularly movable on a base (1), suitable means (5-8) being provided for controlling and determining the amplitude of said angular movement;

a longitudinal slide (4) movable along the slide-carrying guide (3), means being provided for locking the said longitudinal slide in the desired position;

said support (12) being constructed as a transversal slide movable on said longitudinal slide (4) in a direction perpendicular to the movement of the said longitudinal slide.

3. A holding according to claim 1, characterized by the fact that each clamp comprises a lower element (14) presenting a base which is shaped as a portion of a sphere (114) which is intended to be supported capable of being inclined in a circular cavity (13) obtained on the support (12), said lower element (14) terminating upwardly with a head end (15) which cooperates, for the clamping of the interposed lens, with a clamping face of an upper plate (17, 117) mounted in an articulated manner at the end of a locking lever (20, 31) fulcrumed on said support (12).

4. A holder according to claim 3, characterized by the fact that the upper plate (17, 117) of the clamp is mounted at the end of the locking lever (20, 31) by means of an universal joint.

5. A holder according to claim 4, characterized by the fact that the universal joint is a ball-and-socket joint (19-120).

6. A holder according to claim 4, characterized by the fact that the locking lever (31) presents a terminal portion (32) which is axially rotatable at least along a predetermined angle and carries at its end (34) a transverse element (35) adapted to cooperate with a groove (36) provided in the upper plate (117).

7. A holder according to claim 3, characterized by the fact that both the head end (15) of the lower element (14) and the clamping face of the upper plate (17) of the clamp present a concave surface.

8. A holder according to claim 3, characterized by the fact that the head end (15) of the lower element (14) of the clamp is provided at its periphery with a ring (16) made of rubber or rubber-like material, and the upper plate (17, 117) of the clamp presents a lower clamping face provided at its periphery with a ring (18) made of rubber or rubber-like material.

9. A holder according to claim 3, characterized by the fact that the locking lever (20, 31) is actuated by a screw system (22, 23, 37).

10. A holder according to claim 9, characterized by the fact that the locking lever (20, 31) is permanently elastically urged (24, 38) into the clamping position of the clamp.

11. A holder according to claim 6, characterized by the fact that the upper plate of the clamp is constructed as a suction cup (43) carried by a suitable base portion (44) provided with a groove (144) for cooperating with the transverse element (35) carried at the end of the locking lever (31).

12. A holder according to claim 11, characterized by the fact that the head end of the lower element (14) of the clamp presents a concavity (45) adapted to house the suction cup (43) and its base portion (44).

* * * * *